April 24, 1934.  F. LAESSKER  1,956,447

MECHANICAL INFINITIVE VARIABLE SPEED TRANSMISSION

Filed Oct. 18, 1933  3 Sheets-Sheet 1

Inventor
Fritz Laessker
By his Attorney
Eustace S. Glascock

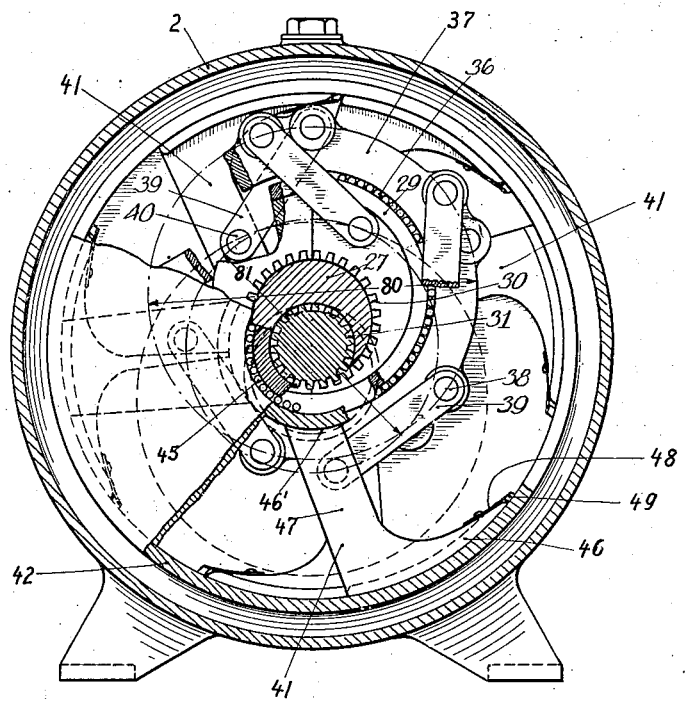

Inventor
Fritz Laessker
By his Attorney
Eustace S. Glascock

Patented Apr. 24, 1934

1,956,447

UNITED STATES PATENT OFFICE 1,956,447

MECHANICAL INFINITIVE VARIABLE SPEED TRANSMISSION

Fritz Laessker, Chemnitz, Germany

Application October 18, 1933, Serial No. 694,184

9 Claims. (Cl. 74—53)

The invention relates to improvements in mechanical infinitive variable speed transmissions, by which a rotary motion is changed by means of relatively adjustable eccentrics into what is best defined as an adjustable swing motion, which in turn is converted through a multiple of clamping members into a new rotative motion.

Among the objects of this invention are,

First: An improved variable speed transmission which is inexpensive, durable and of a high degree of efficiency.

Second: To provide a machine perfectly counterbalanced under all circumstances.

Third: To more nearly eliminate inequalities of the rotary motion imparted to the driven shaft.

Further objects of the invention and the details of the mechanism will appear from the description and claims which follow.

I attain these objects by mechanism illustrated in the accompanying drawings, in which Fig. 1 is a vertical longitudinal cross section through the machine.

Fig. 2 a horizontal cross section taken on line 2—2 in Fig. 1.

Fig. 3 a cross section at right angles to the shaft taken on line 3—3 in Fig. 1.

Fig. 4 showing the eccentric ring, counter weights and eccentrics in a position between minimum and maximum.

Fig. 5 shows the eccentric ring, counter weights and eccentrics in their zero position.

Figure 1:
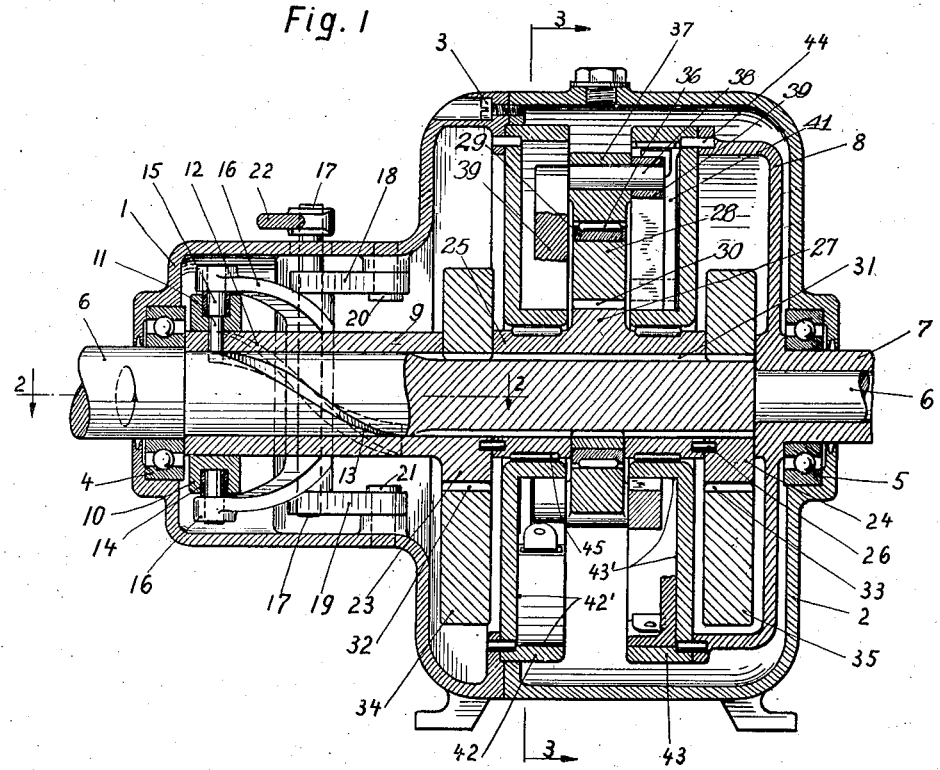

In the transmission gear shown 1 and 2, see Fig. 1, are the two parts of a housing secured together by screws 3. Through the housing the drive shaft 6 extends into the driven shaft 7. The driven shaft 7 projects into the housing and is formed with a cup-shaped terminal 8. Ball bearings 4 and 5 are provided respectively for the shafts 6 and 7.

Figure 2:
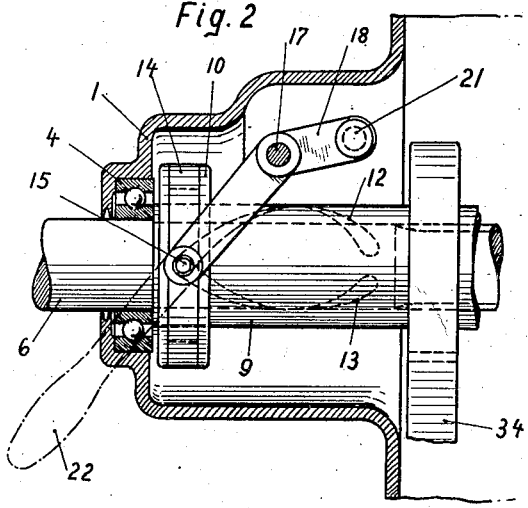

An adjustable sleeve 9 is mounted on the shaft 6 and rotates therewith but is also rotatably adjustable thereon. Ring 10 is mounted on the adjustable sleeve 9 so as to be movable in an axial direction. Ring 10 has a pin 11 engaging in two spiral grooves of opposite hand, one of said grooves 12 being in the adjustable sleeve 9 and one, 13, in the shaft 6. By means clearly shown in Figs. 1 and 2 and well known in the art ring 10 may be moved longitudinal of shaft 6 and thereby produce relative rotation between the adjustable sleeve 9 and the shaft 6. The object of this relative rotation will appear later.

The shaft 6 has turnably mounted thereon a sleeve 25 with an eccentric 27 intermediate its ends. It should be noted that the shaft 6 is furnished with gear teeth or splines 31 for a considerable portion of its length inward from the point where it is reduced in size to enter the driven shaft 7.

In permanent engagement with said gear teeth are: first an outer eccentric 28 having gear teeth 30 on the circumference of its bore and second two eccentric counter weights 34, 35 having gear teeth 32, 33 one within the cup-shaped terminal 8 of the driven shaft 7 in the same plane as an eccentric mass 24 turnably mounted on the drive shaft, and the other in the same plane as an eccentric mass 23 on the adjustable sleeve 9. Hence eccentric 28 and counter weights 34 and 35 rotate as a unit with drive shaft 6. Eccentric masses 23 and 24 are connected by pins 26 to sleeve 25 and have opposite eccentricity to eccentric 27 forming a part of said sleeve. Hence sleeves 9, 25 and eccentrics 23, 24 and 27 rotate as a unit. Eccentric 28 is an outer eccentric embracing inner eccentric 27 and for convenience of assembling is made in two parts 28 and 28', held together by a ring 29.

An outer ring 37 surrounds ring 29 and rollers 36 form an anti-friction bearing between the two.

It may be well to note here that upon revolution of driving shaft 6, ring 37 surrounding the eccentrics will be given a swing motion, the extent of which is governed by the relative position of eccentrics 27 and 28 and this is regulated by movement of ring 10 as more fully set forth in the description of the operation of the device.

I will now describe the means by which the swing motion is converted into a rotary motion of the driven shaft 7.

On each of the outer plane surfaces of ring 37 surrounding the eccentrics 27 and 28 are a plurality of pins 38, illustrated as five, though any convenient number may be used equally distant from the center and equally spaced. Links 39 are pivoted at one end on pins 38 and at the other on pins 40 of unidirectional gripping pieces 41.

In part 1 of the housing is fixedly mounted a ring 42 having a circular groove 42' therein. Connected by pins 44 to the terminal 8 of driven shaft 7 is a similar ring 43 having a circular groove 43'. The gripping pieces now to be described are slidably mounted in these grooves. These two rings preferably have, as shown, anti-friction bearings 45 on the eccentric sleeve 25. The gripping pieces 41 referred to above consist of a longer outer arcuate portion 46 and a shorter inner arcuate portion 46' connected by a narrow rib 47. To each of these narrow ribs at a point nearer the inner end than the outer is pivoted, by means of a pin 40, one of the links 39 above referred to. An auxiliary sliding piece 49 mounted by a spring 48 on the outer arcuate portion 46 assures the locking of the gripping piece if moved in the opposite direction.

There are two sets of these gripping pieces, five in each set in the example illustrated, one set co-operating one at a time with the stationary ring 42 and the other co-operating in a similar way with the ring 43 attached to the cup-shaped terminal 8 of the driven shaft 7.

The operation of the above described variable speed transmission may be explained as follows: Drive shaft 6, driven by a motive power in the direction of the arrow is driving adjusting bushing 9, eccentric bushing 25, eccentric 24 and outer eccentric 28, and of course eccentric 23 which forms a part of the adjusting sleeve or bushing 9. All the aforesaid pieces turn with the same number of revolutions without changing their relative positions. The eccentric 27 produces a swing motion of the ring 37, which swing motion depends on the relative position of eccentric 27 and 28. The relative position of the eccentricity of the eccentric 27 and 28 is changed by means of changing the relative position of adjusting sleeve 9 and drive shaft 6 which last mentioned change also changes the relative position of eccentric bushing 25 and eccentric 23 and 24 to drive shaft 6. The inner eccentric 27 and the outer eccentric 28, both having the same eccentricity, permit any integral eccentricity from zero to the maximum, which is equal to the sum of both eccentricities, inner and outer. A rotary adjustment of adjusting sleeve 9 produces a change of the engagement of gear 30 and internal gear 31, therefore producing a change of eccentricity on eccentric 27 and 28 in relation to each other. The rotary adjustment of sleeve 9 is produced by an axial motion of the ring 10 on adjusting sleeve 9. The axial motion is given through the hand lever 22, the pivoting points 17, the fork lever 16, sliding pieces 14 and studs 15. The pin 11, engaged in the opposite hand spirals 12 and 13, transforms a slidable axial motion of ring 10 into a rotary motion of adjusting sleeve 9 in relation to the drive shaft 6. This adjustment may obviously be made while the machine is in full operation.

The action of the above described mechanism is best understood by considering for a moment the ring 42 as rotatable in which case the following action would take place. The swing motion of the ring 37 produces a condition of varying speeds of the gripping pieces 41 sliding in the grooves 42' and 43' of the rings 42 and 43, by means of the links 39. Considering each group of gripping pieces, the gripping piece having the maximum speed at any particular time will be the one in locked position to the ring 42 or 43.

Therefore, all the other gripping pieces of the same group are moving in the same direction but at a slower speed, thus moving relatively backward to the ring, sliding in the ring, the ring running as fast as the gripping piece with the highest speed, every one of the gripping pieces with slower speeds than the maximum, are idling. The cycle to which each of the gripping pieces have their maximum speed is also the cycle of the change of each gripping piece being active or inactive transmitting the rotary motion. The ring 42 being stationary mounted on the housing half 1 cannot partake of any rotary motion. The rotary motion transmitted to this ring 42 is rejected and directed in the opposite direction back to the eccentric ring 37. That means this ring 37 receives torsional movement and ring 42 is merely a point of abutment. Ring 43 receives also through the swing motion of ring 37 and the action of the gripping pieces, a torsional motion, which is enlarged to the extent of the torsional motion the eccentric ring 37 received from the other side. Ring 43 being attached to terminal 8 at shaft 7 rotary motion is thus imparted to shaft 7. The ratio between the speed of the driven shaft and the driving shaft depends upon the eccentricity used of the drive eccentric 27, which eccentricity may have any size from zero to the maximum. Zero is obtained by the concentric position of ring 37 in which position there is no swing motion.

Depending on the amount of eccentricity of the drive eccentric, all masses of the drive eccentric, as well as ring 37 will run eccentric to the center of the main shaft, which produces vibration of the whole unit. To overcome this detrimental vibration, in all cases counterweights 34 and 35 are mounted so that any centrifugal momentum of the counter weights act in a full equilibrium at all times. The counter weights are mounted on the drive shaft 6 and embrace the eccentric masses 23 and 24, which in turn are opposite 180 degrees away from the inner drive eccentric 27. Their means of adjustment is the same as on the outer eccentric 28. A rotary adjustment of adjustable sleeve 9 and the engagement of the gearing 31, 32 and 33 changes eccentricities of the counter weights and the eccentricity of the drive eccentric 27 and 28 to the same amount and at the same time, but the counter weights are always 180 degrees from the drive eccentric 28. The rotary motion of the counter weights is in the same direction as the rotary motion of the whole mechanism. As described above, the drive eccentric 28 and the counter weights are in constant mesh by gearing with the drive shaft 6. The outer eccentrics in constant mesh with the drive shaft, assuring a protection against changing of relative position through forces such as centrifugal forces of the masses and torsional forces going through the whole mechanism as part of the power transmission. The outer eccentrics are more apt to be influenced by such forces. The inner eccentrics are directly connected to the adjusting mechanism for this reason.

Figure 12:
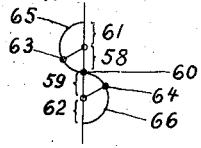
Fig. 12 is a diagrammatic view of the relative position of the gravity centers.

Fig. 12 shows diagrammatically the gravity centers offset by 180 degrees of the drive eccentric 28 and counter weights at all possible positions of eccentricity. Lines 58 and 59 represent the eccentricities of the eccentric 27, 23 and 24. Point 60 represents the center of the drive shaft 6. Line 61 is the eccentricity of the outer eccentric 28 and line 62 is the eccentricity of the counter weights 34 and 35. Points 63 and 64 represent the gravity center of the drive eccentric 28 and of the counter weights 34 and 35. An adjustment of adjusting sleeve 9 will cause the gravity centers 63 and 64 to move at equal distance opposite from each other by 180 degrees on the circular arcs 65 and 66. The very smallest distance from the shaft center equal to the meeting of the two gravity centers, represents the zero position of the mechanism. They may maintain any position from this zero to the possible maximum, which is represented by the lines 58 plus 61, or 59 plus 62.

Figure 6:
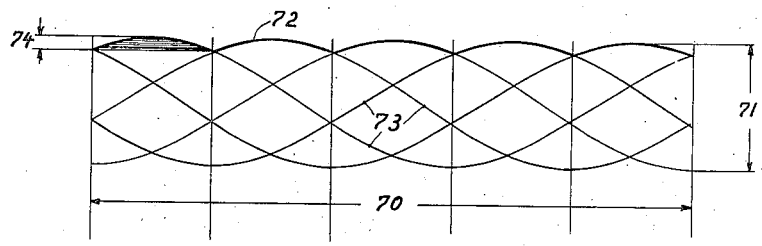
Fig. 6 is a diagrammatic view showing relative speeds of one group of gripping pieces.

The most efficient transmission of power requires the following parts to operate in one plane. Studs 40, part of the gripping pieces 41, the studs 38 of the ring 37, links 39 and the sliding surfaces of the gripping pieces 46 and 46', the bearings of the rings 42 and 43 on the eccentric bushing 25. All these parts work in one plane. The aforesaid construction makes it necessary to dimension the grooves in rings 42 and 43 radially more than the double maximum eccentric radius. The point of attack of the power on the gripping pieces by means of stud 40 is outside of the radial groove center. This one-sided connection of the gripping pieces with their power supply causes a locking of the gripping piece in the groove of rings 42 and 43, and furthermore, this action is aided by the spring 48 and sliding block 49. The motion of the gripping pieces 41 produced by the swing motion of the eccentric ring 37 and link 39 is accelerated and decelerated and takes place approximately in a sinus cycle. Fig. 6 shows a diagrammatic view of the aforesaid cycle of one group of gripping pieces. The line 70 corresponds to one revolution of the drive shaft 6. The ordinates 71 represent the speeds of the gripping pieces. For example, as in our case, a group of five gripping pieces are working successively and each of the gripping pieces transmits power during one-fifth or 72 degrees of one revolution of the drive shaft 6. The heavy line 72 in diagram 6 consisting of parts of the sinus curves 73 represents the real speed of the driven shaft produced by the successive action of a single set of gripping pieces. The difference in length of the ordinates at any position on the heavy line 72 is equal to a change in speed during one revolution of the driven shaft. This variation of speed of the driven shaft is detrimental to some speed transmissions. The object of this invention is the relative positioning of the two groups of gripping pieces so as to equalize the effect of the speed variations of each, producing together a speed curve nearly uniform. This combination enables the driven shaft 7 to run with a higher degree of uniformity than would be possible with a drive of a single group of gripping pieces.

Figure 7:
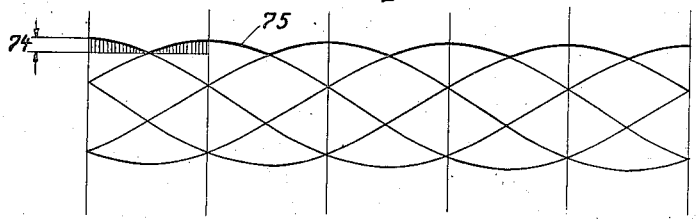
Fig. 7 represents a diagrammatic view of the second group of gripping pieces offset to the first group.
Figure 8:
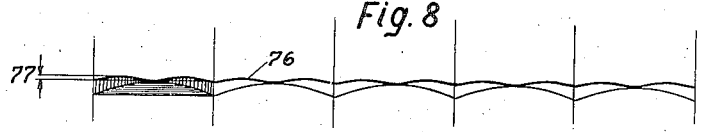
Fig. 8 illustrates diagrammatically the effect of compensating the results from Fig. 6 and Fig. 7.
Figure 9:
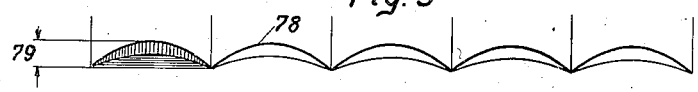
Fig. 9 shows a combined result of the effects shown in Fig. 6 and Fig. 7 when there is no compensating effect.

Fig. 7 shows a diagram of the second group of gripping pieces offset in their cycle 50% to the cycle of the other group of gripping pieces shown by line 75. An offsetting of the two groups of gripping pieces is made possible by the adjustment of the studs 38 of the one group in relation to the studs 38 of the other group. Taking the two diagrams representing two groups of gripping pieces together, the ordinates of one and those of the other at the same time will compensate each other to a diagram line 76 shown in Fig. 8. The maximum difference 77 in the height of the ordinates in Fig. 8 is only a fractional part of the same difference 74 in Figs. 6 and 7. For comparison offset the variations 74 in diagram Fig. 6 and the variations 74 in diagram Fig. 7 so that the difference in ordinates 74 add to each other, speed variation curve 78 in Fig. 9 will be obtained. This last combination of the two groups of gripping pieces should be avoided. The speed variation 79 in Fig. 9 is twice that represented by 74 and is the variation which would be produced if the gripping pieces 41 of one set acted simultaneously and in the same phase with the gripping pieces 41 of the other set. My device avoids this undesirable action. This may be done in the manufacture of the device by offsetting corresponding pins 38 of the opposite faces of an integral eccentric ring 37 as shown in Fig. 1, or by use of a split ring, the two parts of which are adjustable as hereinafter described and shown in Figs. 10 and 11.

The drive pins 40 of the gripping pieces 41 move concentric in a circle 81. The driving studs 38 are mounted on a circle 80 of the eccentric ring 37. The diameters of the circle 80 and the circle 81 vary in their sizes. The circle 80 being the larger one, exceeding the circle 81 by more than the maximum eccentric radius. At this proportion of the circles 80 and 81 the links 39 are turning the least amount in relation to the gripping pieces 41. This in turn is one reason of a possible high degree of efficiency of this machine. The eccentricity may be made comparatively large permitting a high ratio.

It will be seen therefore, that so far as the attainment and maintenance of uniform speed in the driven shaft under constant velocity of the driving shaft is concerned, the invention broadly provides two variable factors in the conversion of the swing motion of ring 37 into a rotary motion of the driven shaft. These two factors pass from a minimum effect to a maximum and down to a minimum again. If the effect of these two factors coincides in phase, the result will be a widely varying velocity imparted to the driven shaft. This is avoided by constructing the device as herein described, so that the maximum effect of the one factor coincides in respect to time with the minimum effect of the other. This corrects the variation and imparts a substantially uniform speed to the driven shaft. More specifically the invention so far as the attainment and maintenance of uniform speed of the driven shaft is concerned, provides a specific construction and arrangement of operating parts producing this result.

Figure 10:
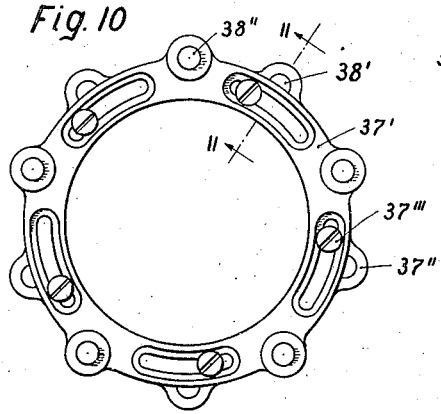
Fig. 10 shows a split eccentric ring and is a modified form of the ring shown in Fig. 1.
Figure 11:
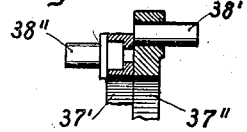
Fig. 11 is a cross sectional view of Fig. 10 taken on line 11—11.

This result is produced in the form shown in Fig. 1 by offsetting to the proper extent the pin 38 on the one side from the pin 38 on the other side of an integral ring 37. In Figs. 10 and 11 is shown a modification in which the ring surrounding the eccentrics 27 and 28 is made of two parts, 37' having arcuate slots therein and 37'' having screw threaded holes. By means of screws 37''' passing through the slots into the holes, the two parts of the ring may be maintained in any adjusted position. This determines the relation of the phase of action of each pin 38' to the phase of action of its co-operative pin 38''.

So far as the maintenance of equilibrium is concerned, the invention broadly provides a unitary adjusting means for the outer drive eccentric and the counter weight and a specific construction of said means, together with counterbalancing masses for the inner drive eccentric.

I claim as my invention:

1. In combination in an intermittent grip mechanism, a ring, two sets of grippers pivotally connected to said ring, and instrumentalities connecting one of said sets of grippers to the other of said sets whereby both said sets may be relatively circumferentially adjusted to change their phase relationship.

2. In a variable speed transmission device a housing, bearings in said housing, a driving shaft supported in one of said bearings and a driven shaft supported in the other, a grooved ring rigidly connected to the housing, and a second grooved ring connected to the driven shaft, an eccentric device mounted on said driving shaft and operated thereby, a ring revolubly mounted on said eccentric device and operated thereby, said ring having two sets of grippers pivotally connected thereto and instrumentalities connecting one of said sets of grippers to the other of said sets whereby both said sets may be circumferentially adjusted to change their phase relationship, one of said sets of grippers lying in the groove of said first named grooved ring and the other in the groove of said second named grooved ring.

3. In a variable speed transmission device, a stationary housing, a driving shaft and a driven shaft journaled therein and means for variably transmitting the rotation of the driving shaft to the driven shaft, said means including an intermittent grip mechanism having a ring, two sets of grippers pivotally connected to said ring, and instrumentalities connecting one of said sets of grippers to the other of said sets whereby both said sets may be relatively circumferentially adjusted to change their phase relationship.

4. In a rotary motion transmitting device, a driving shaft, a driven shaft, an operating connection between them, a stationary housing for said connection, said connection comprising adjustable eccentric revoluble means, actuated by the driving means, a ring surrounding the eccentric revoluble means, and pins projecting laterally from said ring, and two sets of multiple gripping means, with means for periodically connecting the one set of multiple gripping means to the stationary housing and the other set to the driven shaft, each set of said multiple gripping means comprising a plurality of grippers and means for connecting said grippers to the pins projecting from the ring, said grippers moving with varying velocity differing at any given time the one from the other and each operative to lock the grippers of one set with the stationary housing and the grippers of the other set with the driven shaft, whereby the rotary motion of the driving shaft is first converted into a swing motion of the said ring and pins and the swing motion is converted into a rotary motion of the driven shaft.

5. The device as claimed in claim 4 in which each of the pins to which the grippers of one set are connected is offset from the corresponding one of the pins to which the grippers of the other set is connected.

6. The device as claimed in claim 4 and means for adjusting the time relation of the locking engagement of the grippers of one set of multiple gripping means with the locking engagement of the grippers of the other set.

7. In a variable speed transmission device, a drive shaft, a driven shaft, a fixed housing, an eccentric mounted on said drive shaft, a ring embracing said eccentric, pins extending from each side of said ring, a grooved ring secured to the housing, a second grooved ring secured to the driven shaft, a gripping piece slidably mounted in each said grooves, and contacting both sides of said grooves, and links connecting each of said pins to a gripping piece.

8. In a variable speed transmission device, a drive shaft, a driven shaft, a fixed housing, means connecting said shafts, said means comprising an eccentric mounted on said drive shaft, a ring embracing said eccentric, pins substantially circumferentially arranged extending on each side of said ring, a grooved ring secured to the housing, a second grooved ring secured to the driven shaft, gripping pieces pivotally connected to the pins on said eccentric ring and slidably mounted on each of said grooved rings, each of said gripping pieces being provided with a pin and the pins on all said pieces being substantially circumferentially arranged, the diameter of the circumference on which the pin on said eccentric rings are arranged exceeding the diameter of the circumference on which the pins on the gripping pieces are arranged by more than the maximum eccentric radius.

9. In combination a driving shaft and a driven shaft, an intermittent grip mechanism connecting said shafts, the said mechanism being provided with an eccentric sleeve, means for rotating said sleeve with respect to the driving shaft, a counterbalancing device for balancing said mechanism both dynamically and statically, consisting of at least two parts between which the said mechanism is positioned, each said part having a portion mounted on said driving shaft and another portion on the sleeve, and including means whereby when said sleeve is rotated with respect to the shaft all parts of the counterbalancing device will be simultaneously adjusted.

FRITZ LAESSKER.